United States Patent Office 3,235,488
Patented Feb. 15, 1966

3,235,488
RESTORATION OF FOULED PARTICLES
Joseph A. Levendusky, Bayonne, N.J., assignor to
Union Tank Car Company
No Drawing. Filed Oct. 8, 1962, Ser. No. 229,201
6 Claims. (Cl. 210—33)

This invention relates to the method of removing foreign matter from discrete materials and, more particularly to the method of removing fouling material from anion exchange resin particles.

Ion exchange resins are used in the purification of fluids. They find wide application in liquid treatment, particularly water demineralization. After a period of use the resin particles become exhausted and must be regenerated. After repeated use and regeneration it has been found that trace materials accumulate on the surface of the resin beads, particularly upon the anion resin. This fouling of the resin not only interfers with the ion exchange function of the resin in the service run but also impedes proper regeneration. This in turn leads to the need for more frequent regeneration and thus results in shorter service runs. In addition, there may be accumulations upon the resin particles which by reason of their non-uniform build-up can cause channelling or short circuiting in the beds thereby preventing efficient utilization of the resin bed. Finally, the fouling materials accumulate to the point that the capacity and quality of the resin is so impaired that it eventually becomes more economical to discard the resin rather than regenerate it.

A factor in the economics of resin restoration is the number of service units and the permissible down time in the units. Where the allowable down time is limited, it is often necessary to incompletely restore the resin in order to keep the units operating. Thus, it is desirable to have a rapid and efficient means of completely restoring the resins.

In general, fouling materials are removed by subjecting the resins to a chemical treatment. For example, in one process of restoration the resins are mixed with sodium chloride for a period of time and then rinsed. Other chemicals commonly used are sulfuric acid, hydrochloric acid, and sodium hydrosulfite. Since these chemicals are generally used in large amounts, require considerable time to effect restoration and are not easily recoverable, the chemical treatment tends to be costly, both from a material and labor standpoint. Further, the degree of restoration of the resin is not always complete.

Mechanical methods of restoration have also been tested. Generally, the principal disadvantages of mechanical systems has been the fracturing of the resin particles. Fracturing of the resin particles or reduction in their size is undesirable where deep fixed resin beds are used during the service run. This is because the preservation of the original particle size is essential to the proper hydraulic operation of the bed. The present invention overcomes the disadvantages of known methods.

The present invention is based upon the discovery that fouling materials or trace contaminants may be removed from ion exchange resin particles by violently agitating the resins in a confined space whereby the fouling material is removed with limited attrition or breakdown of the resin particles themselves. The invention is further based upon the discovery that fouling material may be removed from the resin particles when a resin slurry is violently agitated within the throat of an ejector or within a confined space by means of an impeller or other suitable driving force and that restoration is completed to a high degree without appreciable attrition of the resin particles. In view of the violent agitation it might be expected that there would be extensive fracturing of the resin particles. However, the scrubbing or scraping action imparted to the resins by the impeller of a centrifugal pump, for example, was found to achieve the beneficial result of contaminant removal without appreciable breakdown of the particles.

Based upon this discovery, the present invention is for the method of restoring fouled anion exchange resins by violently agitating a resin slurry within a confined space, at a sufficient velocity and for a sufficient time to cause abrasion of the resin particles while substantially maintaining the original particle size, thereby removing adhering foreign matter. The method is preferably practiced by forming a slurry of resin particles and violently agitating the slurry within a confined space by means of an impeller. The violent agitation causes abrasion of the resin particles. By controlling the velocity and time of the slurry agitation, contamination is removed without appreciable resin particle breakdown.

In the preferred embodiment of the invention, a slurry of anion resin and water is first prepared. However, a slurry may also be prepared with a solution of resin restoring chemical such as sodium chloride or sulfuric acid in which case the benefit of both chemical restoration and agitation would be obtained. The slurry is then drawn through a centrifugal pump, and returned via a separate conduit to the service vessel. The slurry agitation within the pump and the resultant abrasion caused by the contacting of the resins scrubs the resins and removes the trace contaminants. The resins are circulated or cycled for a period of time until they are suitable for re-use.

The determination as to when the resins are suitable for re-use is made upon the basis of two tests. The first is by using thymol blue dye. Fresh resin when mixed with thymol blue will accept the dye and become dark blue in color. The contaminated resin will not accept the dye as well, depending upon the degree of contamination.

The second test is known as the 10 BVC test. This test is conducted by preparing a column of resin and passing tap water through the column while measuring effluent conductivity. The conductance observed after a throughput of about ten bed volumes represents the quality producing characteristics of the resin. Conductance is measured in micromhos ($\mu$mho). Using this test, an ideal value would be zero with new anion resin generally indicating 0.1 $\mu$mho. As the resin is used and fouling occurs, the micromho value increases. Thus, fouled anion resin might show a value of 8.0 $\mu$mho.

By using both of these tests in conjunction with each other, an accurate determination can be made as to the degree of contamination of the resin.

To further illustrate the invention, a specific example of the method as practiced is set out below.

In a service vessel containing 400 cubic feet of fouled anion exchange resin, water was added to form a slurry. This resin was virtually unusable for further water demineralization. The intake of a centrifugal pump was connected via a suitable conduit to the lower portion of the service vessel and the outlet of the pump was connected to a conduit which served as a return to the top of the service vessel. The pump was rated at 220 volts, 100 gallons per minute. The pump was started and the resins were circulated from the bottom of the service vessel through the pump, where they were subjected to the violent action of the pump impeller, and back to the service vessel. After a period of circulation of the slurry from the service vessel through the pump and back again to the service vessel, samples of resin were extracted and tested for thymol blue acceptance and conductance. When the tests indicated that a sufficient degree of restoration had been accomplished the resins were returned to the service vessel and re-used satisfactorily in the demineralization of water.

I claim:

1. The method of restoring fouled anion exchange resin particles comprising:
    (a) preparing a slurry of said resin particles,
    (b) introducing said slurry into a confined space, and
    (c) violently agitating said slurry within said confined space at a sufficient velocity and for a sufficient time to cause abrasion of said resin particles while substantially maintaining the original particle size of said resin particles whereby contamination is removed from said resin particles without appreciable breakdown thereof.

2. The method of restoring fouled anion exchange resin particles comprising:
    (a) preparing a slurry of said resin particles,
    (b) introducing said slurry into a confined space,
    (c) violently agitating said slurry within said confined space in a substantially rotary manner at a sufficient velocity to cause abrasion of said resin particles while substantially maintaining the original particle size of said resin particles,
    (d) periodically testing said resin particles to determine the degree of contamination of said resin particles, and
    (e) discontinuing said violet agitation when said testing indicates a satisfactory degree of restoration of of said resin particles.

3. The method of restoring fouled anion exchange resin particles comprising:
    (a) preparing a slurry of said resin particles,
    (b) introducing said slurry into a confined space,
    (c) violently agitating said slurry within said confined space in a substantially rotary manner at a sufficient velocity to cause abrasion of said resin particles while substantially maintaining the original particle size of said resin particles,
    (d) periodically testing said resin particles for conductance and thymol blue dye acceptance to determine the degree of resin particle contamination, and
    (e) discontinuing said violent agitation when said testing indicates a satisfactory degree of restoration of said resin particles.

4. The method of restoring fouled anion exchange resin particles comprising:
    (a) preparing a slurry of said resin particles and water in a first zone,
    (b) transferring said slurry into a substantially confined second zone,
    (c) violently agitating said slurry in a substantially rotary manner at a sufficient velocity to cause abrasion of said resin particles while substantially maintaining the original particle size of said resin particles,
    (d) returning said slurry to said first zone,
    (e) continuing said steps of transferring, agitating, and returning of said slurry thereby cycling said slurry through said first zone and said second zone,
    (f) periodically testing said resin particles for conductance and thymol blue acceptance to determine the degree of resin particle contamination, and
    (g) discontinuing said cycling when said testing indicates a satisfactory degree of resin particles restoration.

5. The method of restoring fouled anion exchange resin particles comprising preparing a slurry of said resin particles and violently agitating said slurry with the impeller of a centrifugal pump for a sufficient time to cause abrasion of said resin particles while substantially maintaining the original particle size of said resin particles whereby contamination is removed from said resin particles without appreciable breakdown thereof.

6. The method of claim 5 wherein said resin particles are periodically tested to determine the degree of contamination of said resin particles and discontinuing said violent agitation when said testing indicates a satisfactory degree of restoration of said resin particles.

References Cited by the Examiner

UNITED STATES PATENTS

| 1,890,944 | 5/1932 | Naugle | 210—33 |
| 2,769,547 | 11/1956 | Hirsch | 210—273 |
| 2,781,312 | 2/1957 | Klumb et al. | 210—37 |
| 2,801,966 | 8/1957 | Mertes et al. | 210—33 |
| 2,965,522 | 12/1960 | Crespin et al. | 134—25 |

OTHER REFERENCES

Kunin, "Elements of Ion Exchange," copyright 1960 by Reinhold Publishing Corp., pages 32–36 relied upon.

Lindsay, "American Water Works Association," Journal, vol. 42, Jan.–June 1950, page 77 relied upon.

MORRIS O. WOLK, *Primary Examiner.*